United States Patent
Jiang et al.

(10) Patent No.: US 9,330,165 B2
(45) Date of Patent: May 3, 2016

(54) CONTEXT-AWARE QUERY SUGGESTION BY MINING LOG DATA

(75) Inventors: Daxin Jiang, Beijing (CN); Hang Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 12/371,296

(22) Filed: Feb. 13, 2009

(65) Prior Publication Data

US 2010/0211588 A1     Aug. 19, 2010

(51) Int. Cl.
*G06F 17/30* (2006.01)

(52) U.S. Cl.
CPC ...... *G06F 17/30637* (2013.01); *G06F 17/3064* (2013.01); *G06F 17/30395* (2013.01); *G06F 17/30646* (2013.01); *G06F 17/30693* (2013.01)

(58) Field of Classification Search
CPC ............. G06F 17/30693; G06F 17/30864; G06F 17/3064; G06F 17/30646
USPC ......... 707/759, 767, 768, 769, 771, 776, 778, 707/751
See application file for complete search history.

(56) References Cited

U.S. PATENT DOCUMENTS

| | | | |
|---|---|---|---|
| 6,502,091 B1 * | 12/2002 | Chundi et al. | 707/738 |
| 6,678,681 B1 * | 1/2004 | Brin | 707/754 |
| 6,820,075 B2 * | 11/2004 | Shanahan et al. | 715/205 |
| 7,051,023 B2 | 5/2006 | Kapur et al. | |
| 7,287,012 B2 | 10/2007 | Corston et al. | |
| 7,424,486 B2 | 9/2008 | Whitman et al. | |
| 7,849,080 B2 * | 12/2010 | Chang et al. | 707/723 |
| 7,953,746 B1 * | 5/2011 | Garg et al. | 707/762 |
| 2004/0186827 A1 * | 9/2004 | Anick et al. | 707/3 |
| 2005/0114299 A1 | 5/2005 | Bharat | |
| 2006/0074883 A1 | 4/2006 | Teevan et al. | |
| 2006/0074902 A1 | 4/2006 | Anderson et al. | |
| 2006/0253427 A1 * | 11/2006 | Wu et al. | 707/3 |
| 2006/0271520 A1 | 11/2006 | Ragan | |
| 2007/0005646 A1 | 1/2007 | Dumais et al. | |
| 2007/0162473 A1 * | 7/2007 | Hadzikadic et al. | 707/100 |
| 2008/0065617 A1 | 3/2008 | Burke et al. | |
| 2008/0065631 A1 | 3/2008 | Baeza-Yates et al. | |
| 2008/0071740 A1 | 3/2008 | Jhala et al. | |
| 2008/0104037 A1 | 5/2008 | Bierner | |
| 2008/0208841 A1 | 8/2008 | Zeng et al. | |

(Continued)

OTHER PUBLICATIONS

Bai, Nie, Bouchard, Cao, "Using Query Contexts in Information Retrieval", retrieved on Dec. 30, 2009 at <<http://www.iro.umontreal.ca/baijing/Publication/SIGIR-2007.pdf>>, ACM Proceedings of Conference on Research and Development in Information Retrieval (SIGIR), Personalization, 2007, pp. 15-22.

(Continued)

*Primary Examiner* — Robert Beausoliel, Jr.
*Assistant Examiner* — Nirav K Khakhar
(74) *Attorney, Agent, or Firm* — Steve Wight; Sandy Swain; Micky Minhas (57) ABSTRACT

Techniques described herein describe a context-aware query suggestion process. Context of a current query may be calculated by analyzing a sequence of previous queries. Historical search data may be mined to generate groups of query suggestion candidates. Using the context of the current query, the current query may be matched with the groups of query suggestion candidates to find a matching query suggestion candidate, which may be provided to the user.

18 Claims, 7 Drawing Sheets

(56) References Cited

U.S. PATENT DOCUMENTS

| | | |
|---|---|---|
| 2008/0222145 A1 | 9/2008 | Liu et al. |
| 2009/0171938 A1 | 7/2009 | Levin et al. |
| 2010/0106703 A1 | 4/2010 | Cramer |
| 2010/0153370 A1 | 6/2010 | Gollapudi et al. |

OTHER PUBLICATIONS

Baum, Petrie, Soules, Weiss, "A Maximization Technique Occurring in the Statistical Analysis of Probabilistic Functions of Markov Chains", retrieved on Dec. 30, 2009 at <<http://www.biostat.wisc.edu/~kbroman/teaching/statgen/2004/refs/baum.pdf>>, The Annals of Mathematical Statistics, vol. 41, No. I, 1970, pp. 164-171.

Beeferman, Berger, "Agglomerative clustering of a search engine query log", retrieved on Dec. 30, 2009 at <<http://www.dougb.com/papers/kdd.pdf>>, ACM Proceedings of Conference on Knowledge Discovery and Data Mining (SIGKDD), 2000, pp. 407-416.

Cao, Hu, Shen, Jiang, Sun, Chen, Yang, "Context-Aware Query Classification", retrieved on Dec. 30, 2009 at <<http://www.cse.ust.hk/~derekhh/publications/sigir2009.pdf>>, ACM Proceedings of Conference on Research and Development in Information Retrieval (SIGIR), Classification and clustering, 2009, pp. 3-10.

Chu, Kim, Lin, Yu, Bradski, Ng, Olukotun, "Map-Reduce for Machine Learning on Multicore", retrieved on Dec. 30, 2009 at <<http://www.cs.stanford.edu/people/ang//papers/nips06-mapreducemulticore.pdf>>, Neural Information Processing Systems Foundation (NIPS), 2006, pp. 281-288.

Dean, Ghemawat, "MapReduce: Simplified Data Processing on Large Clusters", retrieved on Dec. 30, 2009 at <<http://labs.google.com/papers/mapreduce-osdi04.pdf>>, Communications of the ACM, vol. 51, Issue 1, Jan. 2008, pp. 107-113.

Dempster, Laird, Rubin, "Maximum Likelihood from Incomplete Data via the EM Algorithm", retrieved on Dec. 30, 2009 at <<http://web.mit.edu/6.435/www/Dempster77.pdf>>, Journal of the Royal Statistical Society, Series B (Methodological), vol. 39, No. 1, 1977, pp. 1-38.

Fonseca, Golgher, Possas, Ribeiro-Neto, Ziviani, "Concept-Based Interactive Query Expansion", retrieved on Dec. 30, 2009 at <<http://homepages.dcc.ufmg.br/~berthier/conference_papers/cikm_2005a.pdf>>, ACM Proceedings of Conference on Information and Knowledge Management, Paper session IR-10 (information retrieval): query expansion, 2005, pp. 696-703.

Gao, Qi, Xia, Nie, "Linear Discriminant Model for Information Retrieval", retrieved on Dec. 30, 2009 at <<http://www.iro.umontreal.ca/~nie/Publication/gao-sigir05.pdf>>, ACM Proceedings of Conference on Research and Development in Information Retrieval (SIGIR), Theory 2, 2005, pp. 290-297.

Huang, Chien, Oyang, "Relevant Term Suggestion in Interactive Web Search Based on Contextual Information in Query Session Logs", retrieved on Dec. 30, 2009 at <<http://www3.interscience.wiley.com/cgi-bin/fulltext/104081841/PDFSTART>>, Wiley Periodicals, Journal of the American Society for Information Science and Technology, vol. 54, No. 7, 2003, pp. 638-649.

Joachims, "Optimizing Search Engines using Clickthrough Data", retrieved on Dec. 30, 2009 at <<http://www.cs.cornell.edu/people/tj/publications/joachims_02c.pdf>>, ACM Proceedings of Conference on Knowledge Discovery and Data Mining (SIGKDD), Web search and navigation, 2002, pp. 133-142.

Jones, Rey, Madani, Greiner, "Generating Query Substitutions", retrieved on Dec. 30, 2009 at <<http://www2006.org/programme/files/pdf/3100.pdf>>, ACM Proceedings of Conference on World Wide Web (WWW), Web mining with search engines, 2006, pp. 387-396.

Liu, Croft, "Cluster-Based Retrieval Using Language Models" retrieved on Dec. 30, 2009 at <<http://ciir.cs.umass.edu/pubfiles/ir-347.pdf>>, ACM Proceedings of Conference on Research and Development in Information Retrieval (SIGIR), Language models, 2004, pp. 186-193.

Rabiner, "A Tutorial on Hidden Markov Models and Selected Applications in Speech Recognition", retrieved on Dec. 30, 2009 at <<http://people.cs.ubc.ca/~murphyk/Bayes/rabiner.pdf>>, Proceedings of the IEEE, vol. 77, No. 2, Feb. 1989, pp. 257-286.

Sugiyama, Hatano, Yoshikawa, "Adaptive Web Search Based on User Profile Constructed without Any Effort from Users", retrieved on Dec. 30, 2009 at <<http://www.iw3c2.org/WWW2004/docs/1p675.pdf>>, ACM Proceedings of Conference on World Wide Web (WWW), Query result processing, 2004, pp. 675-684.

Tao, Zhai, "A Two-stage Mixture Model for Pseudo Feedback", retrieved on Dec. 30, 2009 at <<http://sifaka.cs.uiuc.edu/czhai/pub/sigir04-fb.pdf>>, ACM Proceedings of Conference on Research and Development in Information Retrieval (SIGIR), Posters, 2004, pp. 486-487.

Wang, Zhou, Feng, Wang, Liu, "Mining Complex Time-Series Data by Learning Markovian Models", retrieved on Dec. 30, 2009 at <<http://dbgroup.cs.tsinghua.edu.cn/wangyi/publications/Mining%20Complex%20Time-Series%20Data%20by%20Learning%20Markovian%20Models.pdf>>, IEEE Computer Society, Proceedings of Conference on Data Mining (ICDM), Dec. 18, 2006, pp. 1136-1140.

Wen, Nie, Zhang, "Clustering User Queries of a Search Engine", retrieved on Dec. 30, 2009 at <<http://research.microsoft.com/en-us/people/jrwen/qc-www10.pdf>>, Conference: World Wide Web (WWW), 2001, pp. 162-168.

White, Bilenko, Cucerzan, "Studying the Use of Popular Destinations to Enhance Web Search Interaction", retrieved on Dec. 30, 2009 at <<http://research.microsoft.com/en-us/um/people/mbilenko/papers/07-sigir.pdf>>, ACM Proceedings of Conference on Research and Development in Information Retrieval (SIGIR), Users and the web, 2007, pp. 159-166.

Xu, Li, "AdaRank: A Boosting Algorithm for Information Retrieval", retrieved on Dec. 30, 2009 at <<https://research.microsoft.com/en-us/people/hangli/xu-sigir07.pdf>>, ACM Proceedings of Conference on Research and Development in Information Retrieval (SIGIR), Learning to rank II, 2007, pp. 391-398.

Yoon, Vaidyanathan, "Fast Search of Sequences With Complex Symbol Correlations Using Profile Context-Sensitive HMMS and Pre-Screening Filters", retrieved on Dec. 30, 2009 at <<http://www.systems.caltech.edu/dsp/conf/yoon_april07.pdf>>, IEEE Proceedings of Conference on Acoustics, Speech, and Signal Processing (ICASSP), 2007, pp. I345 to I348.

Zhang, Nasraoui, "Efficient Hybrid Web Recommendations Based on Markov Clickstream Models and Implicit Search", retrieved on Dec. 30, 2009 at <<http://ieeexplore.ieee.org/stamp/stamp.jsp?tp=&arnumber=4427162&isnumber=4427044>> IEEE Computer Society, Proceedings of WIC/ACM Conference on Web Intelligence, Web Intelligence, 2007, pp. 621-627.

Zhao, Li, Ratnaparkhi, Hon, Wang, "Adapting Document Ranking to Users' Preferences using Click-through Data", retrieved on Dec. 30, 2009 at <<http://research.microsoft.com/pubs/70266/tr-2006-15.doc>>, Microsoft Research/Microsoft Corporation, Technical Report MSR-TR-2006-15, Feb. 2006, pp. 1-10.

Office action for U.S. Appl. No. 12/710,608, mailed on Apr. 9, 2014, Jiang et al., "Context-Aware Searching," 19 pages.

Office action for U.S. Appl. No. 12/710,608, mailed on Sep. 28, 2012, Jiang et al., "Context-Aware Searching," 18 pages.

Office action for U.S. Appl. No. 12/710,608, mailed on Oct. 23, 2013, Jiang et al., "Context-Aware Searching," 18 pages.

Smyth, "Clustering Sequences with Hidden Markov Models," Information and Computer Science, University of California, Irvine, 1997, 7 pages.

Cao et al., "Towards Context-Aware Search by Learning a Very Large Variable Length Hidden Markov Model from Search Logs," IW2C2, 2009, 10 pages.

Office action for U.S. Appl. No. 12/710,608, mailed on Apr. 12, 2013, Jiang et al., "Context-Aware Searching," 20 pages.

Office Action for U.S. Appl. No. 12/710,608 mailed on Mar. 14, 2012, Daxin Jiang, "Context-Aware Searching," 17 pages.

Office action for U.S. Appl. No. 12/710,608, mailed on Oct. 29, 2014, Jiang et al., "Context-Aware Searching," 20 pages.

Office action for U.S. Appl. No. 12/710,608, mailed on Oct. 29, 2014, Jiang et al., "Context-Aware Searching", 20 pages.

Office action for U.S. Appl. No. 12/710,608, mailed on Apr. 17, 2015, Jiang et al., "Context-Aware Searching", 23 pages.

(56) References Cited

OTHER PUBLICATIONS

Office action for U.S. Appl. No. 12/710,608 mailed on Sep. 8, 2015, Jiang et al., "Context-Aware Searching," 25 pages.

Baeza-Yates, et al., "Query Recommendation using Query Logs in Search Engines", retrieved on Dec. 2, 2008 at <<http://www.dcc.uchile.cl/~churtado/clustwebLNCS.pdf>>, 10 pages.

Cao, et al., "Context-Aware Query Suggestion by Mining Click-Through and Session Data", retrieved on Dec. 2, 2008 at <<http://www.cs.sfu.ca/~jpei/publications/QuerySuggestion-KDD08.pdf>>, KDD 2008, Aug. 24-27, 2008, Las Vegas, Nevada, ACM, 2008, 9 pages.

Jensen, et al., "Query Phrase Suggestion from Topically Tagged Session Logs", retrieved on Dec. 2, 2008 at <<http://ir.iit.edu/publications/downloads/fqas2006_session_completion.pdf>>, FQAS 2006, LNCS 4027, Springer-Verlag Berlin Heidelberg, 2006, pp. 185-196.

Wen, et al., "Query Clustering in the Web Context", retrieved on Dec. 2, 2008 at <<http://131.107.65.76/users/jrwen/jrwen_files/publications/QC-CIR.pdf>>, Microsoft Research Asia, Kluwer Academic Publishers, 2002, pp. 1-30.

Zhang, et al., "Mining Search Engine Query Logs for Query Recommendation", retrieved on Dec. 2, 2008 at <<http://www.ra.ethz.ch/cdstore/www2006/devel-www2006.ecs.soton.ac.uk/programme/files/xhtml/p214/pp214-zhang/pp214-zhang-xhtml.html>>, WWW 2006, May 23-26, 2006, Edinburgh, Scotland, ACM, 2006, pp. 1-4.

* cited by examiner

CONTEXT-AWARE QUERY SUGGESTION BY MINING LOG DATA

BACKGROUND

A search engine is a tool designed to search for information on the World Wide Web (WWW), where the information may include web pages, images, information and/or other types of files. Some search engines help users to refine their search queries by showing a number of search suggestions (i.e., query suggestions), in addition to the search results. These suggestions can be used as queries in the next step of the search process.

The effectiveness of a user's information retrieval from the web largely depends on whether the user can provide queries to search engines that properly describe the needed information. Writing queries is not easy, partially because queries are typically expressed using a small number of words (one or two words on average) and many words are ambiguous e.g., have different meanings depending on how they are used. To make the problem even more complicated, different search engines may respond differently to the same query. Therefore, there is no "standard" or "optimal" way to present queries to search engines, and as a result, query formulation is a bottleneck issue in the usability of search engines.

Many commercial search engines such as GOOGLE, YAHOO, LIVE SEARCH, ASK, and BAIDU provide query suggestions to improve usability. That is, by guessing a user's search intent, a search engine can suggest queries which may better reflect the user's information need. A commonly used query suggestion method finds similar queries in search logs and uses those queries as suggestions for each other. Another approach mines pairs of queries which are adjacent or co-occur in the same query sessions.

However, the aforementioned techniques may be slow and do not necessarily resolve any ambiguities in the search patterns.

SUMMARY

Techniques described herein describe a context-aware query suggestion process. The method may receive a sequence of input queries that includes a current query. Context of the current query may be calculated by analyzing a sequence of previous queries. Historical search data, such as search logs, may be mined to generate groups of query suggestion candidates. Specifically, the method may find concepts and generate query sessions from the search logs, which may be used to create a concept data structure. Using the context of the current query, the current query may be matched with the groups of query suggestion candidates (e.g., by using the concept data structure) to find matching query suggestion candidate(s), which may be provided to the user. Thus the method is directed to generating query suggestions based on context of the user's search.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying FIGs. In the FIGs, the left-most digit(s) of a reference number identifies the FIG. in which the reference number first appears. The use of the same reference numbers in different FIG.s indicates similar or identical items.

While the invention may be modified, specific embodiments are shown and explained by way of example in the drawings. The drawings and detailed description are not intended to limit the invention to the particular form disclosed, and instead the intent is to cover all modifications, equivalents, and alternatives falling within the spirit and scope of the present invention as defined by the claims.

DETAILED DESCRIPTION

This document describes a system and methods for a context-aware query suggestion process. In other words, the methods described herein are directed to generating query suggestions based on context of a search. For example, if a user presents a query of "gladiator," it may be difficult to determine the user's search intent. Specifically, without knowing the context of the search, it may be difficult to determine whether the user is interested in the history of gladiators, famous gladiators, or the movie "GLADIATOR." Without considering context of the user's search, a query suggestion method may improperly suggest queries having various possible meanings. However, if the method can find that the user submits a query of "beautiful mind" before "gladiator," it is likely that the user is interested in the movie "gladiator." Moreover, the user is probably searching for films starring Russell Crowe. Thus the query context including the recent queries issued by the user can help with understanding of the user's search intent. As a result, the method may generate more meaningful query suggestions.

In short, when a user submits a query q, the method may capture the context of q which is reflected by a short sequence of queries issued by the same user immediately before q. Then the method may both check the historical data as well as determine what queries many users often ask after q in the same context. Those queries may then become the candidates for suggestion.

Specifically, the method may access search logs (e.g., historical data for user queries and corresponding Uniform Resource Locators (URLs)) and may build a data structure, such as a click-through bipartite graph, that may correlate queries to click-through URL's. As the name suggests, click-through URLs are URLs that the user(s) actually clicked through/on, as opposed to URLs that may have came up on a search query but the user(s) never chose (e.g., by clicking on the respective URL). The method may also create query sessions from the search logs, which may help with finding frequent contexts from the search data.

The method may mine concepts from the click-through bipartite to find one or more concepts. This process may include clustering the queries and their corresponding URLs (as described below). Next, a concept data structure, such as a concept sequence suffix tree, may be created and/or updated using the concepts and the query sessions.

The method may receive a short sequence of queries (e.g., from a user). The method may derive a concept sequence from the short sequence of queries, and then match that concept sequence in the concept data structure created in the off-line step (e.g., the concept sequence suffix tree). This matching may operate to find the concept(s) in the concept data structure that the user's next query may belong to, and thus the system/method may suggest one or more queries that correspond to the found concept(s).

This brief introduction is provided for the reader's convenience and is not intended to limit the scope of the claims, nor the proceeding sections.

Illustrative Flow Diagram

Figure 1:
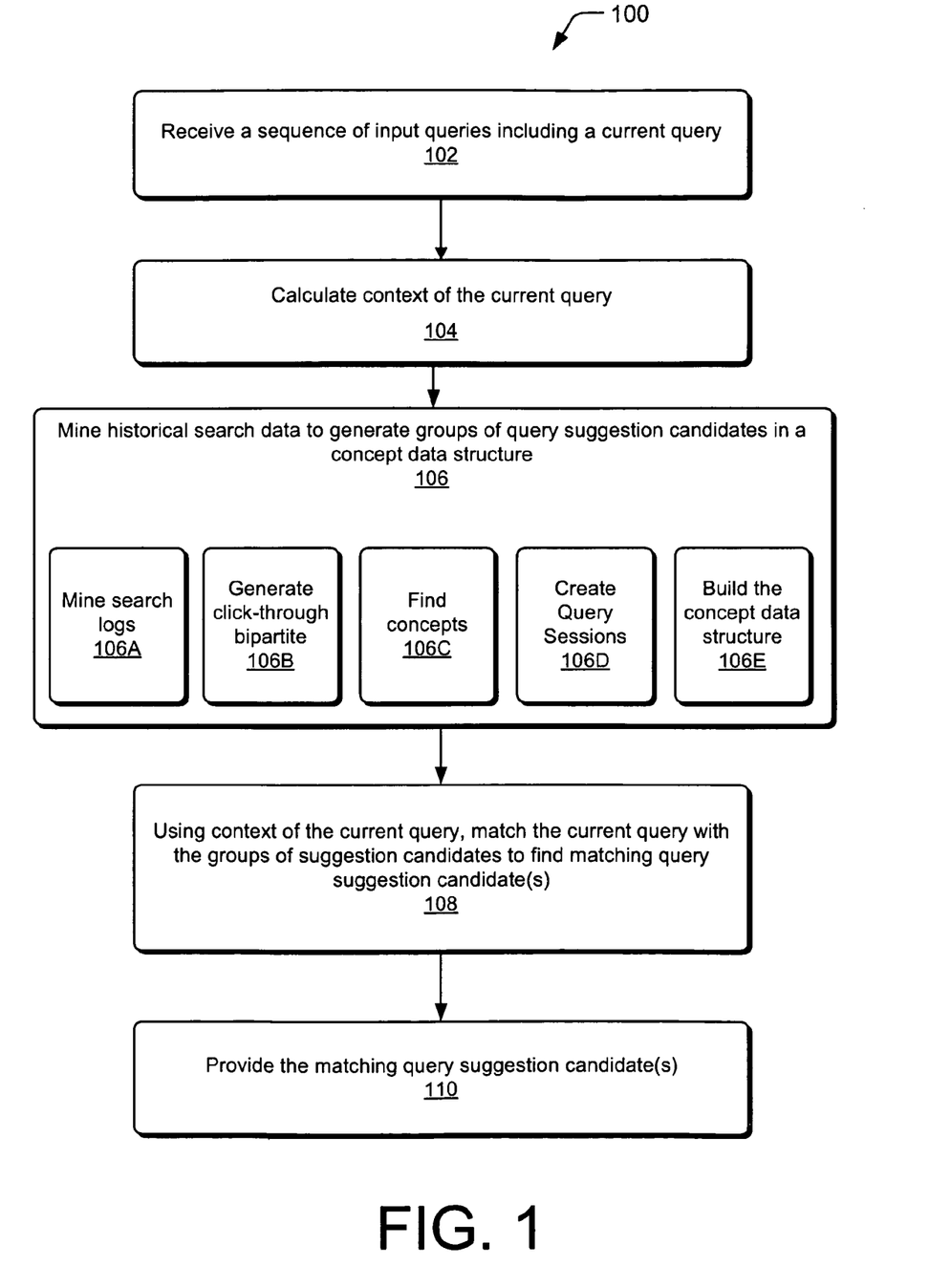
FIG. 1 illustrates exemplary method(s) for Context-Aware Query Suggestion by Mining Log Data, according to certain embodiments.

FIG. 1 depicts an illustrative flow diagram of a process 100 for context-aware query suggestion process, according to certain embodiments. Although the description enclosed herein is directed to using a web browser to search the Internet, it is possible to use the method(s) described herein for other uses, such as for searching a relational database, among others.

At block 102, the method may receive a sequence of input queries including a current query, according to certain embodiments. For example, the input queries may be input by a user at a client computer, such as using a web browser (or any other internet application). An exemplary input query may include three queries, q1, q2, and q3, although these are described for explanation only, and input queries that contain more or less elements may be easily used instead. In certain embodiments, the block 102 may occur on-line (e.g., in response to a user entering the input query), although it is possible that the input query is entered off-line (such as from a query input file).

At block 104, the method may calculate context of the input queries, according to certain embodiments. Specifically, the method may convert the input queries into a corresponding concept sequence, such as using the exemplary input queries of q1, q2, and q3 into one or more of exemplary concepts C1, C2, and C3, such as described below with reference to FIG. 2A. The exemplary concepts C1, C2, and C3 may be previously found, e.g., found off-line as a part of the block 104. Thus in certain embodiments, elements 102 and 104 may be performed in a reverse order, or simultaneously, as desired. In certain embodiments, the block 104 may be performed on-line (e.g., in response to a user entering the input query), although it is possible that the input query is entered and then analyzed off-line (such as from a query input file). An exemplary data structure/algorithm used for calculating the context of the input queries (e.g., to find query sessions) is described below with reference to FIG. 2C.

At block 106, the method may mine historical search data to generate groups of query suggestion candidates, according to certain embodiments. Block 106 may include sub-blocks 106A-E as described below. The historical data may be stored on one or more search logs, such as search logs of FIG. 2A.

At block 106A, the method may mine search logs that contain user queries and corresponding Uniform Resource Locators (URLs), as described below. At block 106B, the method may build one or more data structures, such as a click-through bipartite, that may correlate queries to click-through URLs. The click-through URLs are URLs that the user(s) actually clicked through/on, as opposed to URLs that may have came up on a search query but the user(s) never chose (e.g., by clicking on the respective URL). An exemplary click-through bipartite is described below with reference to FIG. 2B, although other data structures as contemplated and may be used in addition to, or instead of, the one described.

At block 106C, the method may find concepts from the exemplary click-through bipartite, such as described below with reference to element 206 of FIG. 2A and FIG. 3. However, other methods of finding concepts are contemplated, such as finding concepts directly from the search log data (i.e., and thus not generating and/or using the exemplary click-through bipartite). At block 106D, the method may generate query sessions from the search logs, such as to find frequent contexts from the search data (as described below with reference to FIG. 2C). For example, the query sessions may be created by clustering the queries and their corresponding URLs.

Next, at block 106E, a concept data structure, such as a concept sequence suffix tree, may be created and/or updated using the concepts and the query sessions, such as described below with reference to FIGS. 2A and 4. In certain embodiments a different data structure may be used in addition to, or instead of, the one described. Each element of the concept data structure may correspond to a sequence of concepts (such as determined above), and each element of the concept data structure may also be associated with one or more candidate suggestions for the input query.

In certain embodiments, the block 106 may occur off-line (e.g., prior to a user entering the input query), although it is possible that mining of the historical search data to generate groups of query suggestion candidates is performed on-line (e.g., in response to a user entering the input query). In certain embodiments, only portions of the block 106 (e.g., one or more of the sub-locks 106A-E) may be performed off-line, while other portions of block 106 may be performed on-line. However, performing all or even some of portions of the block 106 off-line may have the advantages of speeding up any remaining portions of the process, e.g., by freeing up the processing for other tasks, such as performing the on-line elements.

At block 108, the method may, using context of the current query, match the current query (such as received at the block 102) with the groups of candidate suggestions, according to certain embodiments. In other words, the matching may find the concept(s) in the concept data structure that the user's next query may belong to. In certain embodiments, the block 108 may occur on-line (e.g., in response to a user entering the input query), although it is possible that the input query is entered off-line (such as from a query input file), and the matching may be performed off-line as well.

At block 110, the method may provide one or more queries that correspond to the found concept(s), according to some embodiments. For example, in response to receiving the input queries (e.g., of the block 102), the system/method may match the current query to the concept data structure, and provide the matching query suggestion candidates to the user (e.g., as described below with reference to FIG. 2A), such as a possible next query to be used in user's search.

As described above, certain portions of the blocks of FIG. 1 may occur on-line or off-line. Specifically, certain blocks or portions of the blocks may be performed off-line in order to save processing time and/or speed-up response of the on-line portions. It is also understood that certain acts need not be performed in the order described, and may be modified, and/or may be omitted entirely, depending on the circumstances.

Figure 2A:
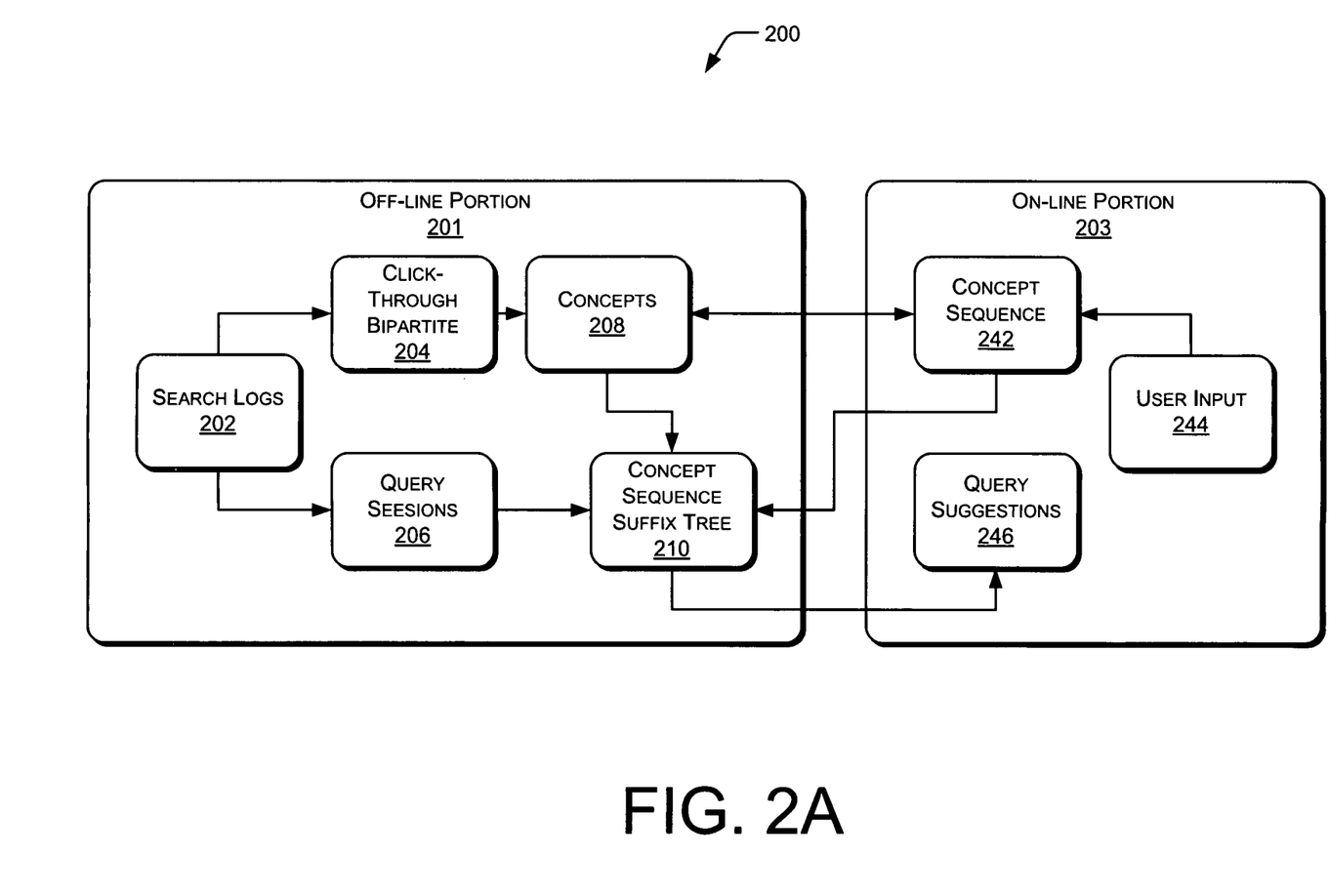
FIG. 2A-C illustrate exemplary framework for Context-Aware Query Suggestion by Mining Log Data, according to certain embodiments.

FIG. 2A is an exemplary block diagram of a framework 200 that may be used for the context-aware query suggestion process that includes an off-line and an on-line step, such as described above with reference to FIG. 1, according to certain embodiments.

In certain embodiments, in the off-line portion 201, the method may mine search logs (such as described above with reference to the block 106 of FIG. 1). The mining (e.g., block 106A of FIG. 1) of the search logs 202 may operate to create both a click-through bipartite 204 (e.g., block 106B of FIG. 1) that relates the queries to URLs and query sessions 206 (e.g., block 106D of FIG. 1). The method may find one or more concepts 208 (e.g., block 106C of FIG. 1) from the click-through bipartite 204. Both the one or more concepts 208 and the query sessions 206 may be used to create a concept data structure 210 (e.g., block 106E of FIG. 1).

The information contained in the search logs 202 may contain information about queries and their clicked URL sets. This historical information may be gathered by recording each query presented by a user(s) to a search engine and a set of URLs that may be returned as the answer. The URLs clicked by the user, called the clicked URL set of the query, may be used to approximate the information need described by the query.

In certain embodiments, in the on-line portion 203, the method may receive user input 244 (e.g., such as receiving a sequence of input queries as described above with reference to the block 102). The method may calculate the context of the input queries (such as described above with reference to the block 104). The method may then access the concept data structure 210 in order to find one or more query suggestions 246 for the user. The one or more query suggestions 246 may be provided to the user (such as described above with reference to the block 110).

Although FIG. 2A shows off-line 201 and on-line 203 portions, it is understood that one or more of elements in the off-line portion 201 may be performed on-line 203, as desired. Similarly, one or more of elements in the on-line portion 203 may be performed off-line 201, as desired. Thus the elements are divided up as shown for exemplary purposes only. However, by performing certain elements, or portions of elements, off-line, while other elements, or portions of elements on-line, may have the advantages of speeding up any on-line portions of the process, e.g., by freeing up the processing for other tasks, such as performing the on-line elements.

Figure 2B:
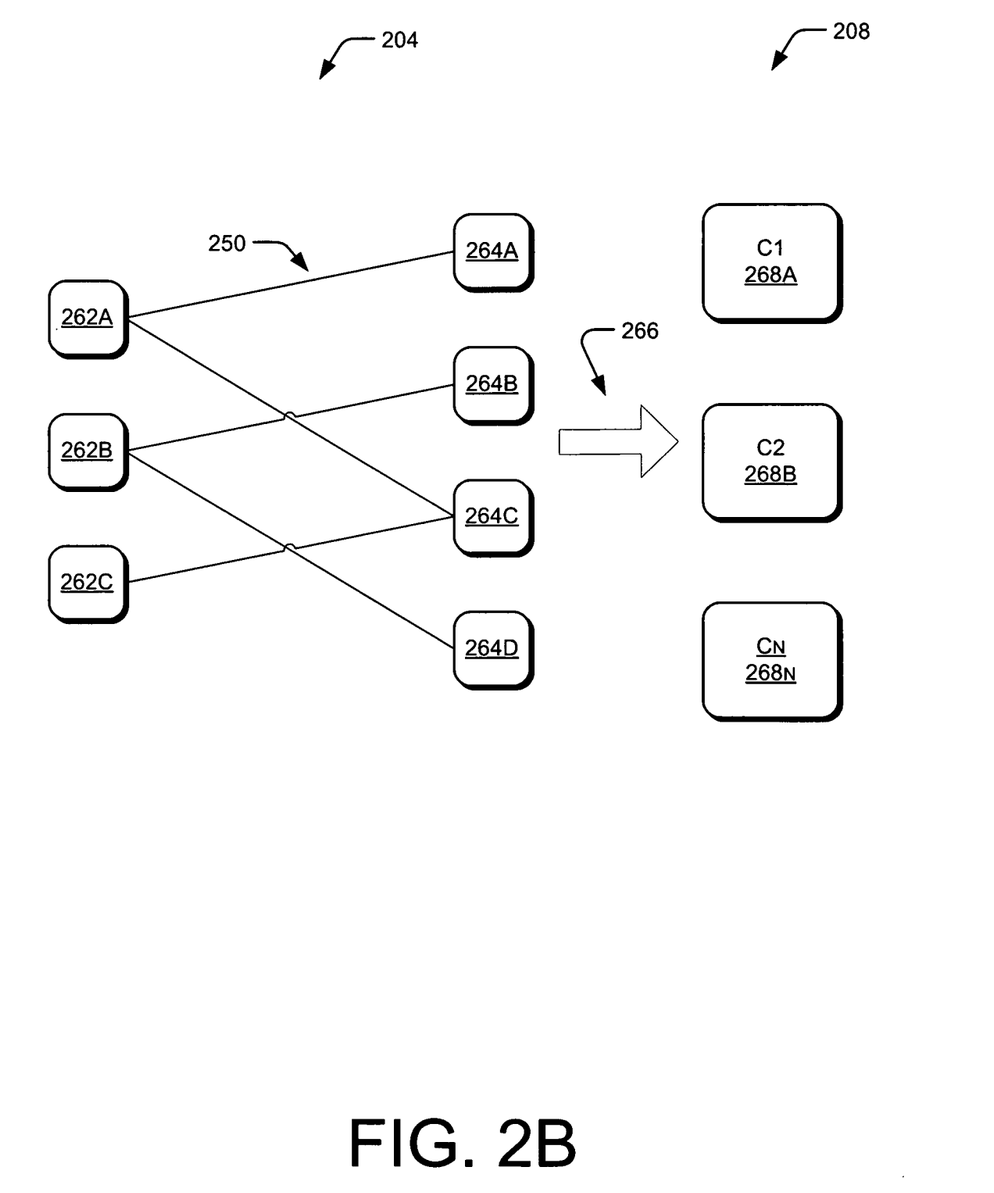

FIG. 2B illustrates more details for the block 106 of FIG. 1, as well as how concepts 208 may be derived from the click-through bipartite 204 of FIG. 2A, according to some embodiments. Thus the click-through bipartite 204 may be created (e.g., block 106B of FIG. 1) by mining the search logs 202 that contain historical search data. Exemplary elements 262A-C may correspond to exemplary queries made by one or more users. Exemplary elements 264A-D may correspond to exemplary URLs that indicate URLs that the user(s) actually clicked through/on, as opposed to URLs that may have came up on a search query but the user(s) never chose (e.g., by clicking on the respective URL). Thus the elements 264A-D may be referred to as click-through URLs. In certain embodiments, the elements 264A-D may only correspond to the URLs for the current user, as opposed to a plurality of users.

The click-through bipartite 204 may thus correlate the queries 262A-C to the click-through URLs 264A-D, where each of the queries 262A-C may relate to one or more URLs 264A-D. For example, the query 262A may correspond to two URLs 262A and 264D. The one or more concepts 268A-C (e.g., element 208 of FIG. 2A) may be derived (e.g., block 106C of FIG. 1) from the click-through bipartite 204 via a sub-process 266 (also referred to herein as a clustering algorithm 266) as described below. However, other sub-processes may be used in addition to, or instead of, the one described.

In certain embodiments, the clustering algorithm 266 may use a new data structure called a dimension array (such as the dimension array 302 described below with reference to FIG. 3). The clustering algorithm 266 may address the following issues: 1) when the size of data (e.g., the click-through bipartite 204) is large; 2) the number of dimensionality of the click-through bipartite 204 is very high; 3) the number of clusters (e.g., of the resulting concepts 268A-C) is unknown; and 4) the log data (e.g., of the search logs 202) may evolve incrementally.

A search log 202 may be contain information about sequences of query and click events. From the search log 202, the method may construct (e.g., block 106B of FIG. 1) the click-through bipartite 204 as follows. A query node 262A may be created for one or more of the unique queries in the log search 202. For example, a URL node 262A may be created for each unique URL in the search log 202. An edge $e_{ij}$ 250 may be created between query node $q_i$ 262A and URL node $u_j$ 264A if $u_j$ is a clicked URL of $q_i$. A weight $w_{ij}$ (not shown) of edge $e_{ij}$ 250 may represent the total number of times when $u_j$ is a click of $q_i$ aggregated over the whole search log 202.

The click-through bipartite 204 may be used to find similar queries. Specifically, if two queries share many clicked URLs, they may be found to be similar to each other. From the click-through bipartite 204, the method may represent each query $q_i$ as a normalized vector, where each dimension may correspond to one URL in the click-through bipartite 204. To be specific, given the click-through bipartite 204, let Q and U be the sets of query nodes and URL nodes, respectively. The j-th element of the feature vector of a query $q_1 \in Q$ is:

$$\vec{q_i}[j] = \begin{cases} norm(w_{ij}) \\ 0 \end{cases}$$

if edge $e_{ij}$ exists, otherwise where $q_i \in Q$ and the following otherwise:

$$norm(w_{ij}) = \frac{w_{ij}}{\sqrt{\sum_{\forall e_{ik}} w_{ik}^2}}.$$

The distance between two queries $q_i$ and $q_j$ may be measured by the Euclidean distance between their normalized feature vectors, such as:

$$distance(q_i, q_j) = \sqrt{\sum_{u_k \in U} (\vec{q_i}[k] - \vec{q_j}[k])^2}.$$

Figure 2C:
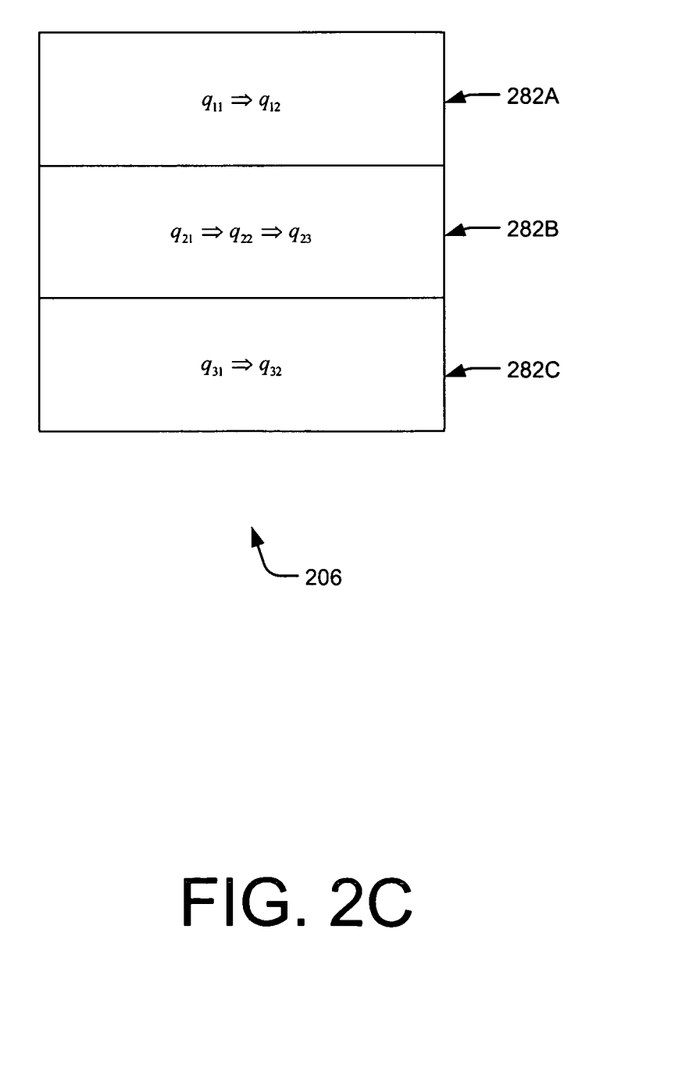

FIG. 2C illustrates more how query sessions 206 may be derived (e.g., block 106D of FIG. 1) from the search logs 202 of FIG. 2A, according to some embodiments. The query sessions 206 may enumerate the subsequences of sessions 282A-C, and thus reduce the computation complexity from an exponential magnitude (such as present in many sequential pattern mining algorithms) to quadratic magnitude. In certain embodiments, other mining methods may be used in addition to, or instead of, the one described, such as sequential pattern mining algorithms that enumerate most or all of the combinations of concepts, among others.

The context of a user query may include the immediately preceding queries issued by the same user. To learn a context-aware query suggestion model, the method may collect query contexts 282A-C from the user query sessions 206. In certain embodiments, the method may construct session data in three steps, although other ways to construct session data are contemplated, such that use more or less steps, as desired. First, the method may extract each individual user's behavior data from the search log 202 as a separate stream of query/click events. Second, the method may segment each user's stream into sessions based on the following rule: two consecutive events (either query or click) are segmented into two sessions if the time interval between them exceeds 30 minutes (however, the time interval is exemplary only and other values may be used instead). Finally, the method may discard the click events and only keep the sequence of queries in each session.

Figure 3:
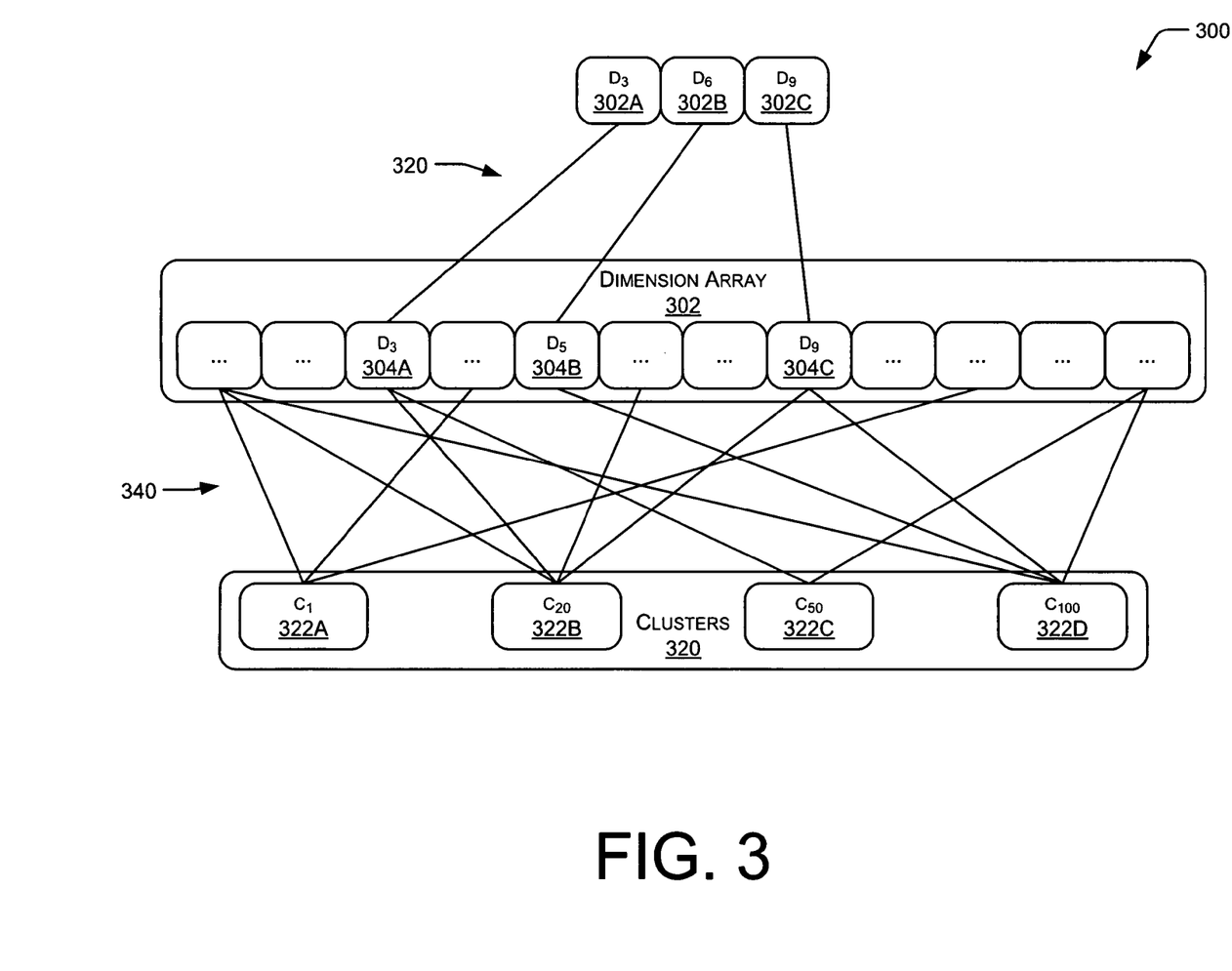
FIG. 3 depicts an illustrative data structure that may be used for clustering queries into concepts, according to certain embodiments.

FIG. 3 illustrates how the clustering algorithm 266 may use the dimension array 302 to generate (e.g., block 106C of FIG. 1) one or more concepts (also referred to as clusters) 320, according to certain embodiments. The dimension array 302 may be used for clustering queries, where each of the clusters 322A-322D may correspond to the one or more concepts 264A-D of FIG. 2B. The clustering algorithm 266 may scan the data set (e.g., contained in the click-through bipartite graph 204). For each query q (e.g., each of the queries 262A-C), the clustering algorithm 266 may find any non-zero dimensions, and then may follow any corresponding links in the dimension array to insert the query q into an existing cluster or initiate a new cluster with q.

Specifically, the method may summarize individual queries into concepts, where each concept may represent a small set of queries that are similar to each other. By using concepts to describe contexts, the method may address the sparseness of queries and interpret users' search intent. As described above, to find concepts in the queries, the method may use the clicked-through URLs as answers to queries. Specifically, the method may find concepts by clustering queries in the click-through bipartite 204. With the help of concepts, a context can be represented by a short sequence of concepts about the queries asked by a user in a current search session.

In certain embodiments, Algorithm 1 may be used to implement a portion of the clustering algorithm 266:

---
Example Algorithm 1 - Clustering queries.
---
Input: the set of queries Q and the diameter threshold Dmax;
Output: the set of clusters Θ;
Initialization: dim array[d] = φ for each dimension d;
1:   for each query $q_i \in Q$ do
2:      C-Set = φ;
3:      for each non-zero dimension d of vector (qi) do
4:         C-Set ∪ = dim array[d];
5:      C = arg argmin$_{C' \in C\text{-}Set}$ distance(qi;C');
6:      if diameter(C ∪ {qi}) · Dmax then
7:         C ∪ = {qi}; update the centroid and diameter of C;
8:      else C = new cluster ({qi}); Θ ∪ =C;
9:      for each non-zero dimension d of vector (qi) do
10:        if C = dim_array[d] then link C to dim_array[d];
11:  return Θ
---

In certain embodiments, a cluster C 322A-D may correspond to a set of queries 302A-C. The normalized centroid of each cluster may be determined by:

$$\vec{c} = norm\left(\frac{\sum_{q_i \in C} \vec{q_i}}{|C|}\right),$$

where |C| is the number of queries in C. The distance between a query q and a cluster C may be given by distance $$(q, C) = \sqrt{\sum_{u_k \in U} (\vec{q}[k] - \vec{c}[k])^2}.$$

The method may adopt the diameter measure to evaluate the compactness of a cluster, i.e., $$D = \sqrt{\frac{\sum_{i=1}^{|C|} \sum_{j=1}^{|C|} (\vec{q_i} - \vec{q_j})^2}{|C|(|C|-1)}}.$$

The method may use a diameter parameter Dmax to control the granularity of clusters: every cluster has a diameter at most Dmax.

In certain embodiments, the method may use one scan of the queries 302A-C, although in other embodiments, the method may use more than one scan/set of queries. The method may create a set of clusters 320 as the queries are scanned. For each query q 302A-C, the method may find the closest cluster C 322A-D to q among the clusters 320 obtained so far, and then test the diameter of C∪{q}. If the diameter is not larger than Dmax, q may be assigned to C and C may be updated to C∪{q}. Otherwise, a new cluster containing only q may be created.

In certain embodiments, where the queries in the click-through bipartite 204 may be sparse, to find out the closest cluster to q, the method may check the clusters 320 which contain at least one query in $Q_q$. In certain embodiments, since each query may only belong to one cluster, the average number of clusters to be checked may be relatively small.

Thus, based on the above idea, the method may use a dimension array data structure 302 of FIG. 3) to facilitate the clustering procedure. Each entry of the array 302 may correspond to one dimension di and may link to a set of clusters $\Theta_i$ 320, where each cluster $C \in \Theta_i$ contains at least one member query $q_j$ such that (vector $q_j) \neq 0$. As an example, for a query q, if the non-zero dimensions of (vector q) are $d_3$ 304A, $d_6$ 304B, and $d_9$ 304C. To find the closest cluster to q, the method may only union the cluster sets $\Theta_3$ 322A, $\Theta_6$ 322B, and $\Theta_9$ 322C, which may be linked by the $3^{rd}$ 304A, the $6^{th}$ 304B, and the $9^{th}$ 304C entries of the dimension array 302, respectively. In certain embodiments, the closest cluster to q may be a member of the union.

In certain embodiments, where the click-through bipartite graph 204 may be sparse, the clusters 320 may be derived by finding the connected components from the bipartite graph 204. To be specific, two queries $q_s$ and $q_t$ may be connected if there exists a query URL path $q_s$-$u_1$-$q_1$-$u_2$-...-$q_t$ where a pair of adjacent query and URL in the path may be connected by an edge. A cluster of queries may be defined as a maximal set of connected queries. In certain embodiments, this variation of the clustering method may not use a specified parameter Dmax.

In certain embodiments, where the bipartite graph 204 may be both well connected and sparse (e.g., where almost all queries, no matter similar or not, may be included in a single connected component), a different approach may be used. Specifically, the method may operate to prune the queries and URLs without degrading the quality of clusters. Edges with low weights may be formed due to users' random clicks, and thus may be removed to reduce noise. For example, let $e_{ij}$ be the edge connecting query $q_i$ and $u_j$, and $w_{ij}$ be the weight of $e_{ij}$. Moreover, let $w_i$ be the sum of the weights of all the edges where q1 is one endpoint, i.e., $w_i = \Sigma_j w_j$. The method may prune an edge $e_{ij}$ if the absolute weight $w_{ij} \leq \tau_{abs}$ or the relative weight $w_{ij}/w_i \leq \tau_{rel}$, where $\tau_{abs}$ and $\tau_{rel}$ may be user specified thresholds. After pruning low-weight edges, the method may further remove the query and the URL nodes whose degrees become zero.

Figure 4:
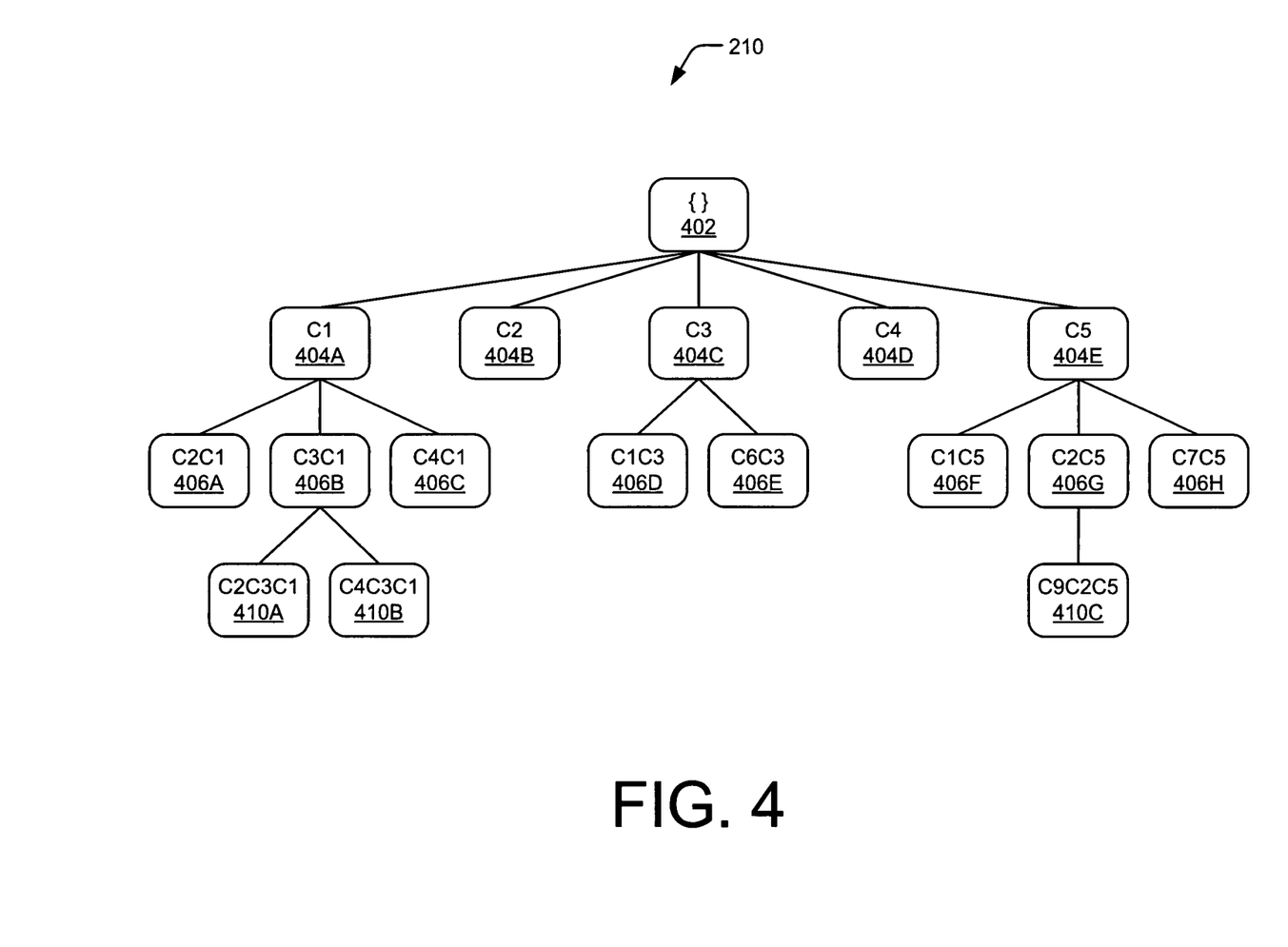
FIG. 4 depicts an illustrative data structure that may be used for generating suggestions, according to certain embodiments.

FIG. 4 illustrates more detail for the concept data structure 210. It may not be feasible to search a large search log on-line for a given context. In certain embodiments, the method may thus mine frequent contexts from historical sessions in the search logs 202. The mined contexts may be organized into a concept data structure 210, such as a sequence suffix tree structure 210 that can be searched quickly. For the purposes of efficiency, this mining process may be performed off-line, as described above.

Queries in the same session may be related. However, since users may formulate different queries to describe the same search intent, mining patterns of individual queries may miss interesting patterns. To address this problem, the method may map each session $qs=q_1 q_2 \ldots q_l$ in the training data into a sequence of concepts $cs=c_1 c_2 \ldots c_l$, where a concept $c_i$ may be represented by a cluster Ci (as described above) and a query $q_i$ may be mapped to $c_i$ if $q_i \epsilon C_i$. If two consecutive queries belong to the same concept, the method may record the concept only once in the sequence.

In certain embodiments, the method may mine patterns from concept sequences by mining all frequent sequences from session data. For each frequent sequence $cs=c_1 c_2 \ldots c_l$, the method may use $c_l$ as a candidate concept for $cs'=c_1 c_2 \ldots c_1$. The method may build a ranked list of candidate concepts c for Cs' based on their occurrences following Cs' in the same sessions, e.g., the more occurrences of c, the higher c is ranked. For each candidate concept c, the method may choose from the corresponding cluster C the member query which has the largest number of clicks as the representative of C. In certain embodiments, the method may only keep the representative queries of the top K (e.g., K=5) candidate concepts. These representative queries (i.e., the candidate suggestions for sequence cs') may be used for query suggestion when cs' is observed on-line.

In certain embodiments, since the concepts co-occurring in the same sessions are often correlated in semantics, the actual number of concept sequences in session data may be less than the number of possible combinations of concepts. Also, for the concept sequence $cs=c_1 c_2 \ldots c_l$, of a session, since the method is interested in extracting the patterns for query suggestions, only the subsequences with lengths from 2 to 1 may be considered. For example, a subsequence of the concept sequence cs is a sequence $c_{1+i}, \ldots c_{m+i}$, where I≥0 and m+i≤l. Therefore, the number of subsequences to be considered for Cs may be only equal to (l*(l−1))/2. Finally, the average number of concepts in a session may be small. Based on these observations, the method may not enumerate the combinations of concepts, and may enumerate the subsequences of sessions instead.

In certain embodiments, the method may implement the mining of frequent concept sequences with a distributed system under a map-reduce programming model. In the map operation, each machine (called a process node) may receive a subset of sessions as input. For the concept sequence cs of each session, the process node may output a key-value pair (cs', 1) to a bucket for each subsequence cs' with a length greater than 1. In the reduce operation, the process nodes may aggregate the counts for cs' from all buckets and may output a key-value pair (cs', freq) where "freq" is the frequency of cs'.

A concept sequence cs' may be pruned if its frequency is smaller than a given threshold (which may be found by the method or it may be pre-set by the user). Once the method obtains frequent concept sequences, they may be organized into the concept sequence suffix tree 210. Formally, a suffix of a concept sequence $cs=c_1 c_2 \ldots c_1$ may be an empty sequence or a sequence $cs'=c_{l-m+1} \ldots c_1$, where m≤1 (m<1). In a concept sequence suffix tree 210, each node may correspond to a frequent concept sequence cs. Given two nodes $c_{si}$ and $c_{sj}$, $c_{si}$ is the parent node of $c_{sj}$ if $c_{si}$ is the longest proper suffix of $c_{sj}$. Except the root node 402 which corresponds to the empty sequence, each node (e.g., nodes 404A-E, 406A-H, and 410A-C) in the concept sequence suffix tree 210 may be associated with a list of candidate query suggestions.

In certain embodiments, Algorithm 2 below may be used to for the process of building a concept sequence suffix tree 210. Basically, the algorithm may start from the root node 402 and may scan the set of frequent concept sequences. For each frequent sequence $cs=c_1 c_2 \ldots c_j$, the Algorithm 2 below may find the node cn corresponding to $cs'=c_1 \ldots c_{j-1}$. If the node cn does not exist, the algorithm may create a new node for cs' recursively. Finally, the Algorithm 2 may update the list of candidate concepts of cs if $c_1$ is among the top K candidates.

As exemplary Algorithm 2 for building the concept sequence suffix tree may be as follows:

---

Example Algorithm 2 - Building the suffix tree

Input: the set of frequent concept sequences CS and the number K of candidates;
Output: the suffix concept tree T ;
Initialization: T.root=0;
1:  for each frequent concept sequence cs = $c_1 \ldots c_j$ do
2:     cn = findNode($c_1 \ldots c_{j-1}$, T);
3:     minc = $\text{argmin}_c \epsilon_{cn:candlistc}$ = cs.freq;
4:     if (cs.freq > minc.freq) or (|cn.candlist| < K) then
5:     add $c_j$ into cn.candlist; $c_j$.freq= cs.freq;
6:     if |cn.candlist| > K then remove minc from cn.candlist;
7:  return T;
Method: FindNode(cs = $c_1 \ldots c_j$, T);
1:  if j<sj = 0 then return T.root;
2:  cs' = cs = $c_2 \ldots c_j$; pn = findNode(cs', T); cn = pn.childlist[c1];
3:  if cn == null then
4:     cn = new node (cs); cn.candlist=φ;
     pn.childlist[$c_1$]= cn;
5:  return cn;

---

In Algorithm 2, the major cost for each sequence may come from the recursive function findNode, which looks up the node cn corresponding to $cs=c_1 \ldots c_{j-1}$. Thus, the recursion may execute at (l−1) levels. At each level, the potential costly operation may be the access of the child node cn from the parent node pn (the last statement in line 2 of Method findNode). In certain embodiments, Algorithm 2 may use a heap structure to support the dynamic insertion and access of the child nodes. However, in practice, only the root node may have a large number of children, which does not exceed the number of concepts NC; while the number of children of other nodes may be usually small.

Online Query Suggestion Generation

As described above with reference to block 108 of FIG. 1, the method may use the context of the current query to march the current query with the concept data structure 210. An exemplary query generation process is explained below.

The method may receive a sequence of user input queries $q_1 \ldots q_l$ (e.g., the block 102 of FIG. 1 and/or element 244 of FIG. 2A). The query sequence may also be mapped into a concept sequence (e.g., element 242 of FIG. 2A) (e.g., in order to find context). However, an on-line input query $q_i$ may be new and may not belong to any concept derived from the search/training data. Moreover, if $q_i$ is a new query, no click-through information may be available. In this case, the mapping process may stop and the concept sequence (e.g., element 242 of FIG. 2A) corresponding to $q_{i+1} \ldots q_l$ may be returned.

In certain embodiments, after the mapping procedure, the method may start from the last concept in the sequence and search the concept sequence suffix tree 210, from the root node 402, although different starting points may be used instead. An exemplary search process is illustrated in Algorithm 3 below. The method (i.e., the Algorithm 3) may maintain two pointers: curC is the current concept in the sequence and curN is the current node on the suffix tree 210. The method may check whether the current node curN has a child node chN whose first concept is the same as curC. If so, the method may move to the previous concept (if exists) of curC and visit the child node chN of curN.

In certain embodiments, if no previous concept exists, or no child node chN of curN matches curC, the search process may stop, and the candidate suggestions of the current node curN may be used for query suggestion. A special case may occur when curN is the root node 402 when the search process stops. In this case, there may be no match for the last concept in the concept sequence in the suffix tree 210. In this case, the method may not be able to provide query suggestions according to the current user input.

In certain embodiments, when generating query suggestions on-line, the method may maintain the dynamic heap structure as during the building process of the suffix tree 210. Instead, the method may serialize the children of the root node 402 into a static array structure and thus reduce the cost of the search.

An exemplary Algorithm 3 may be used for query suggestion (e.g., block 108 of FIG. 1):

---
Example Algorithm 3 - Generating the query suggestion
---
Input: the concept sequence suffix tree T and user
input query sequence qs;
Output: the ranked list of query suggestions S-Set;
Initialization: curN= T.root; S-Set = φ;
1:   map qs into cs;
2:   curC = the last concept in cs;
3:   while true do
4:       chN = curN's child node whose first concept is curC;
5:       if (chN == null) then break;
6:       curN = chN; curC = the previous concept of curC in cs;
7:       if (curC == null) then break;
8:   if curN != T.root then
9:       S-Set = curN's candidate suggestions;
10:  return S-Set;
---

Exemplary Computing Device

Figure 5:
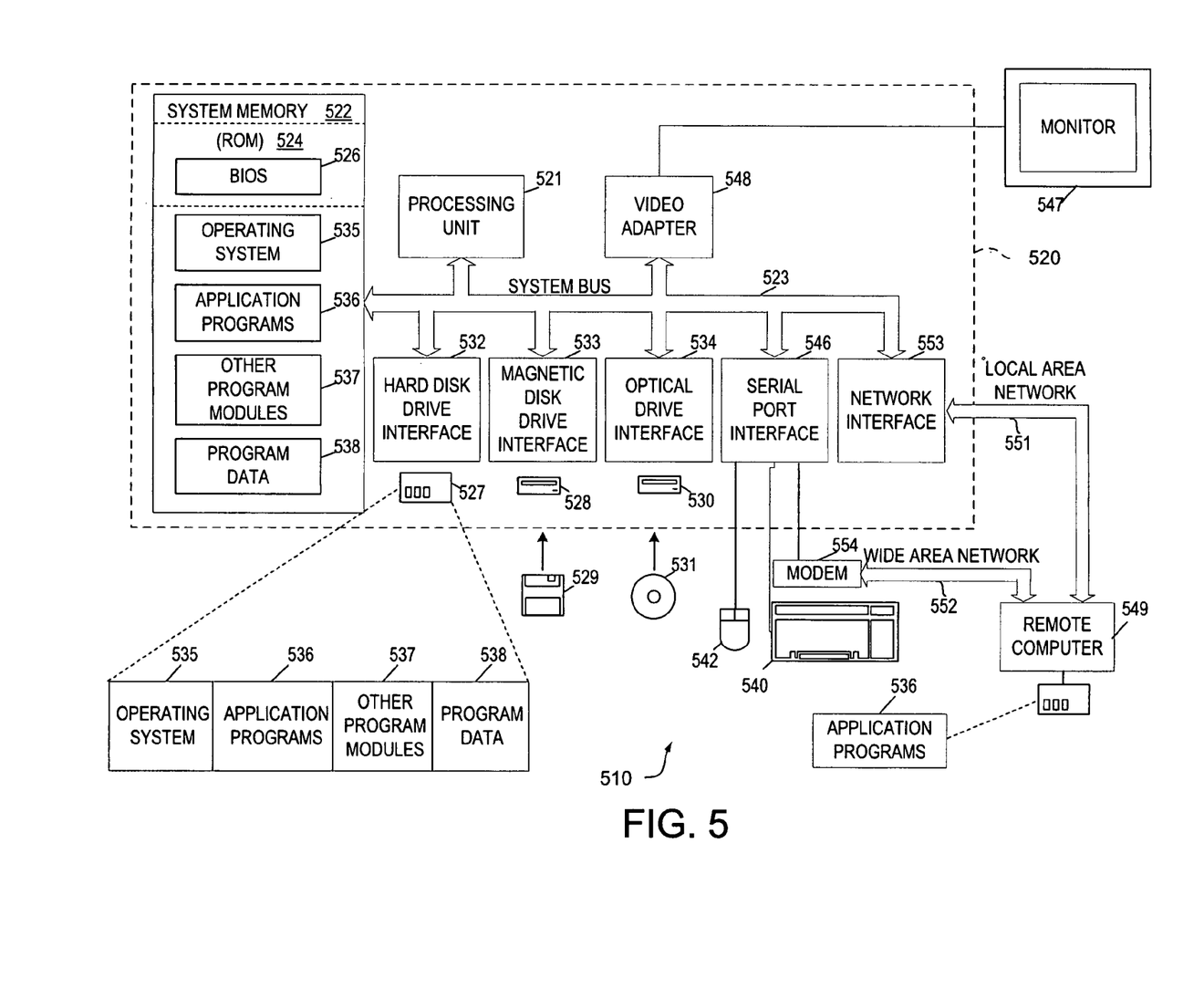
FIG. 5 illustrates one possible environment in which the systems and methods described herein may be employed, according to certain embodiments.

FIG. 5 illustrates one operating environment 510 in which the various systems, methods, and data structures described herein may be implemented. The exemplary operating environment 510 of FIG. 5 includes a general purpose computing device in the form of a computer 520, including a processing unit 521, a system memory 522, and a system bus 523 that operatively couples various system components include the system memory to the processing unit 521. There may be only one or there may be more than one processing unit 521, such that the processor of computer 520 comprises a single central-processing unit (CPU), or a plurality of processing units, commonly referred to as a parallel processing environment. The computer 520 may be a conventional computer, a distributed computer, or any other type of computer.

The system bus 523 may be any of several types of bus structures including a memory bus or memory controller, a peripheral bus, and a local bus using any of a variety of bus architectures. The system memory may also be referred to as simply the memory, and includes read only memory (ROM) 524 and random access memory (RAM) 525. A basic input/output system (BIOS) 526, containing the basic routines that help to transfer information between elements within the computer 520, such as during start-up, is stored in ROM 524. The computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 are connected to the system bus 523 by a hard disk drive interface 532, a magnetic disk drive interface 533, and an optical disk drive interface 534, respectively. The drives and their associated computer-readable media provide nonvolatile storage of computer-readable instructions, data structures, program modules and other data for the computer 520. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 529, optical disk 531, ROM 524, or RAM 525, including an operating system 535, one or more application programs 536, other program modules 537, and program data 538. A user may enter commands and information into the personal computer 520 through input devices such as a keyboard 40 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port, or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The computer 520 may operate in a networked environment using logical connections to one or more remote computers, such as remote computer 549. These logical connections may be achieved by a communication device coupled to or a part of the computer 520, or in other manners. The remote computer 549 may be another computer, a server, a router, a network PC, a client, a peer device or other common network node, and typically includes many or all of the elements described above relative to the computer 520, although only a memory storage device 550 has been illustrated in FIG. 5. The logical connections depicted in FIG. 5 include a local-area network (LAN) 551 and a wide-area network (WAN) 552. Such networking environments are commonplace in office networks, enterprise-wide computer networks, intranets and the Internal, which are all types of networks.

When used in a LAN-networking environment, the computer 520 is connected to the local network 551 through a network interface or adapter 553, which is one type of communications device. When used in a WAN-networking environment, the computer 520 typically includes a modem 554, a type of communications device, or any other type of communications device for establishing communications over the wide area network 552. The modem 554, which may be internal or external, is connected to the system bus 523 via the serial port interface 546. In a networked environment, program modules depicted relative to the personal computer 520, or portions thereof, may be stored in the remote memory storage device. It is appreciated that the network connections shown are exemplary and other means of and communications devices for establishing a communications link between the computers may be used.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   calculating context of a current query, the context of the current query comprising a sequence of input queries including the current query;
   matching the current query with a group of query suggestion candidates to find one or more matching query suggestion candidates based at least in part on the context of the current query, the matching comprises:
   matching the sequence of input queries to a sequence of concepts;
   matching the sequence of concepts to one or more elements in a concept sequence tree wherein the matching the sequence of concepts comprises:
   traversing the concept sequence tree from one level to another level based at least in part on the different consecutive concepts of the sequence of concepts; and
   obtaining the one or more catching query suggestion candidates from a node of the concept sequence tree, the node comprising the last matchable concept of the sequence of concepts; and
   providing the one or more matching query suggestion candidates.

2. The method of claim 1, further comprising mining historical data to generate groups of query suggestion candidates, wherein mining the historical data comprises:
   finding one or more concepts associated with a plurality of queries in the historical search data;
   finding one or more frequent contexts in the historical search data; and
   generating the groups of query suggestion candidates using the one or more concepts and the frequent contexts.

3. The method of claim 2, wherein the historical search data comprises a plurality of subsequences of sessions, wherein said finding the one or more frequent contexts in the historical search data comprises enumerating the plurality of the subsequences of sessions.

4. The method of claim 2, wherein the historical search data comprises historical data including a plurality of queries and a plurality of Uniform Resource Locators (URLs), and wherein said finding the one or more concepts comprises:
   relating each of the plurality of queries to one or more URLs of the plurality of URLs to generate relationships between the one or more queries and the one or more URLs; and
   creating the one or more concepts from the relationships between the one or more queries and the one or more URLs.

5. The method of claim 4, further comprising: creating the concept sequence tree from the one or more frequent contexts and the one or more concept sequences.

6. The method of claim 4, wherein said relating one or more queries to one or more URLs comprises creating a bipartite graph, wherein a first set of elements in the bipartite graph comprises the one or more queries, wherein a second set of elements in the bipartite graph comprises the one or more URLs, wherein each of the first set of elements is related to one or more elements of the second set of elements in the bipartite graph.

7. The method of claim 1, wherein calculating the context of the current query is performed off-line; and wherein matching the current query and providing the matching query suggestion candidate are performed on-line.

8. The method of claim 1, further comprising mining historical search data to generate groups of query suggestion candidates, wherein the historical search data comprises historical data including a plurality of queries and a plurality of Uniform Resource Locators (URLs) for a plurality of users.

9. The method of claim 1, further comprising mining historical search data to generate groups of query suggestion candidates, wherein the historical search data comprises historical data including a plurality of queries and a plurality of Uniform Resource Locators (URLs) only for a user providing the current query.

10. A system comprising:
    one or more processors; and
    memory storing instructions that, when executed by the one or more processors, configure the one or more processors to perform operations comprising:
    receiving a sequence of input queries including a current query;
    mapping the sequence of input queries to a sequence of concepts, each concept comprising a cluster of queries and an input query of the sequence of input queries being converted to at most one concept of the sequence of concepts, wherein: when no click-through information is available for a particular input query, mapping the sequence of input queries to the sequence of concepts stops at the particular input query and the sequence of concepts corresponds to one or more input queries of the sequence of input queries that have been mapped prior to the particular input query; and
    matching the sequence of concepts to an element in a concept data structure to obtain one or more matching query suggestions, each element of the concept data structure corresponding to a particular sequence of concepts and associated with a particular set of query suggestions.

11. The system of claim 10, the operations further comprising mining one or more search logs to create the concept data structure, wherein the one or more search logs comprise historical data relating each of a plurality of queries to one or more Uniform Resource Locators (URLs), and wherein said mining the one or more search logs comprises:

relating one or more queries of the plurality of queries to one or more URLs of the plurality of URLs to generate relationships between the one or more queries and the one or more URLs; and     creating one or more concepts from the relationships between the one or more queries and the one or more URLs.

12. The system of claim 11, wherein said mining the one or more search logs to create the concept data structure comprises:

finding one or more query sessions associated with the plurality of queries in the one or more search logs; and     generating the concept data structure from the one or more query sessions and the one or more concepts, wherein each node in the concept data structure corresponds to one or more query suggestions.

13. The system of claim 11, wherein the relationships between the one or more queries and the one or more URLs comprise a bipartite data graph, wherein a first set of elements in the bipartite graph comprises the one or more queries, wherein a second set of elements in the bipartite graph comprises the one or more URLs, wherein each of the first set of elements is related to one or more elements of the second set of elements in the bipartite graph.

14. The system of claim 11, wherein said mining the one or more search logs is performed off-line and wherein said matching the current query is performed on-line.

15. A system comprising:

one or more processors;

memory storing instructions executable by the one or more processors, cause the one or more processors to perform acts comprising:

receiving a sequence of input queries including a current query;

mapping the sequence of input queries to a sequence of concepts, each concept of the sequence of concepts comprising a cluster of queries and an input query of the sequence of input queries being configured to map to at most one concept of the sequence of concepts; and     matching the sequence of concepts to one or more elements in a concept sequence tree to generate one or more matching query suggestions, wherein matching the sequence of concepts comprises:

traversing the concept sequence tree from one level to another level based at least in part on different and consecutive concepts of the sequence of concepts; and         obtaining the one or more matching query suggestions from a node of the concept sequence tree, the node comprising the last matchable concept of the sequence of concepts.

16. The system of claim 15, wherein the acts further comprise providing the one or more matching query suggestions.

17. The system of claim 15, wherein the acts further comprise mining one or more search logs to generate one or more concepts, each of the one or more search logs comprising a plurality of queries and a plurality of URLs, wherein mining the one or more search logs to generate the one or more concepts comprises:

relating one or more queries of the plurality of queries to one or more URLs of the plurality of URLs to generate relationships between the one or more queries and the one or more URLs; and     creating the one or more concepts from the relationships between the one or more queries and the one or more URLs.

18. The system of claim 17, wherein the acts further comprises building the concept sequence tree, and the building comprises:

finding one or more query sessions from the one or more search logs; and     creating the concept sequence tree from the one or more query sessions and the one or more concepts.

\* \* \* \* \*